Figure 1:
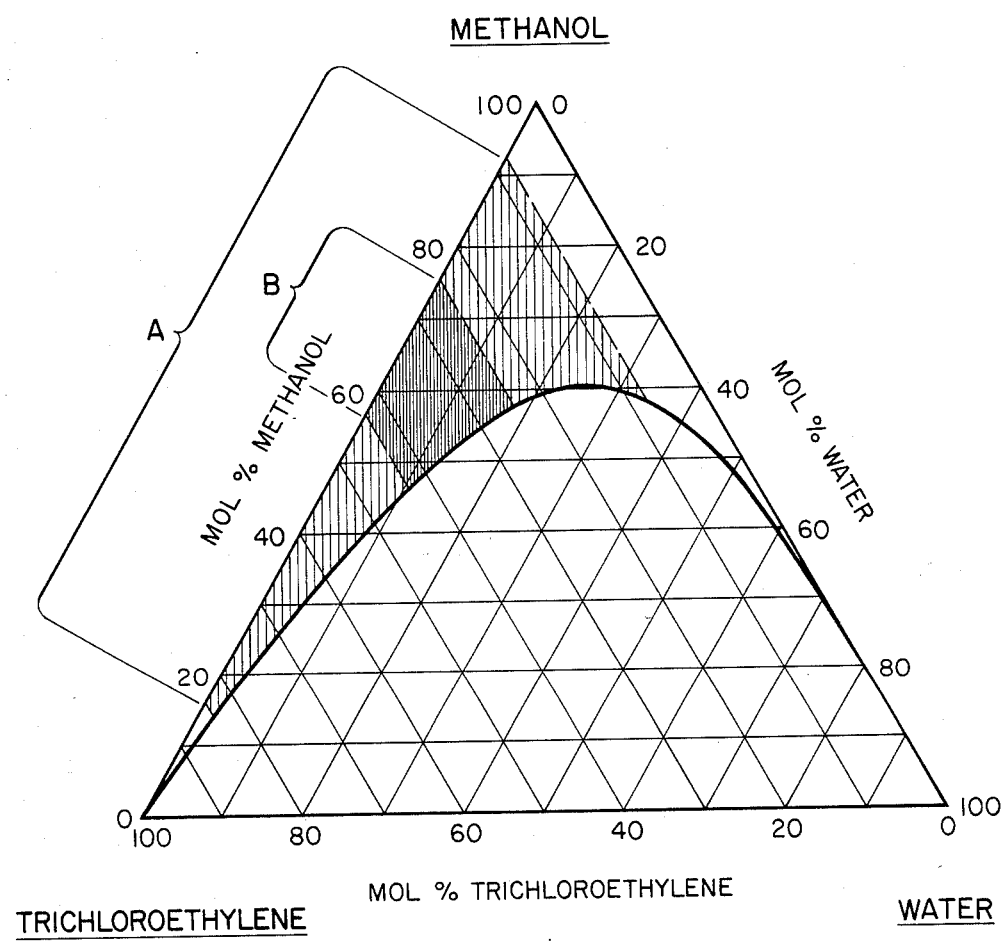

United States Patent [19]

Cantu et al.

[11] Patent Number: 4,498,246

[45] Date of Patent: Feb. 12, 1985

[54] ALCOHOL/HEAVY LIQUID DRYING OF COAL

[75] Inventors: Terry S. Cantu, Ponca City, Okla.; Mark C. Williams, Berkeley, Calif.

[73] Assignee: Conoco Inc., Ponca City, Okla.

[21] Appl. No.: 535,003

[22] Filed: Sep. 22, 1983

[51] Int. Cl.³ .............................................. F26B 3/00
[52] U.S. Cl. ...................................................... 34/9
[58] Field of Search ............................................... 34/9

[56] References Cited

U.S. PATENT DOCUMENTS

| 3,327,402 | 6/1967 | Lamb et al. | 44/1 C |
| 3,589,023 | 6/1971 | Figiel | 34/9 |
| 4,307,518 | 12/1981 | Izumo et al. | 34/9 |

Primary Examiner—John J. Camby
Attorney, Agent, or Firm—Cortlan R. Schupbach

[57] ABSTRACT

Water content of coal is reduced during heavy liquid-/ash separation processes by adding an alcohol containing from 1 to 3 carbon atoms to the heavy liquid. These alcohols are miscible with both the heavy liquid and with the water and provide a continuous phase for water removal.

10 Claims, 2 Drawing Figures

SINGLE PHASE DIAGRAM
20° C

ALCOHOL/HEAVY LIQUID DRYING OF COAL

This invention relates to the drying of certain carbonaceous materials such as coal, lignite and the like. More specifically, this invention relates to a process for removing water from such particulate carbonaceous materials by utilizing a mixture of heavy organic liquids and an alcohol containing from 1 to 3 carbon atoms in order to form a continuous phase and abstract water from the carbonaceous material during a float separation process.

Coal as mined is frequently subjected to washing processes, or in some modern mines to slurry transportation systems, which result in coal particles having a high degree of surface moisture. This moisture leads to difficulty in handling and shipping. Various methods for dewatering such coal have been utilized over the years. In addition, many lignite materials inherently contain a very high amount of water. In some cases the amount of such water in lignite particles is as high as 65% by weight. At least a portion of this moisture must be removed in order to obtain efficient burning of the lignite and also to reduce the cost of transporting such materials.

It must be realized that the drying of solid carbonaceous materials before further processing is well known. By reducing the moisture level of such materials, the calorific value per unit weight is enhanced. Many materials such as coal and mineral oils are conveniently dried by countercurrent treatment with hot combustion gases. In addition, methods for dewatering coals have been practiced. These include methods of mechanical drainage as well as filtration. Other methods, used separately or in combination with mechanical water removal, include fluid bed drying and other conventional drying techniques. Representative but non-exhaustive examples of such techniques are U.S. Pat. Nos. 2,176,902, 3,381,388; and 3,520,067.

Lignite has been dehydrated as described in U.S. Pat. No. 2,610,115 wherein ground lignite is mixed with mineral hydrocarbon oil and the mixture heated to a temperature of 350° F., during which process moisture is removed from the lignite and hydrocarbon vapors are absorbed within the lignite mass. U.S. Pat. No. 3,928,325 teaches a method in which a solvent medium bath comprising a mixed solvent system having a plurality of layers contacts the wetted material and removes moisture from the wetted material. The wetted solvent is then subjected to azeotropic distillation which regenerates the solvent media. U.S. Pat. No. 4,014,104 teaches a method for drying coal using methanol, while U.S. Pat. No. 4,212,112 shows a process for drying coal using benzene.

The prior art also teaches a process of separating coal and ash using halogenated hydrocarbons as set forth in U.S. Pat. No. 2,109,234. U.S. Pat. No. 4,252,639 describes a coal beneficiation process in which coal containing material matter in water is conditioned by treating the raw wet coal with a halogenated hydrocarbon and a surfactant. The conditioned coal is then separated from ash by float-sink and surface water from the coal is transferred to the surfactant and is removed with the mineral matter.

However, all these methods have certain drawbacks and deficiencies. Especially in recent years, the importance of coal cleaning for obtaining proper BTU return has been noticed. Efficient systems for separating ash from coal have been identified, such as the heavy organic liquid processing scheme set forth. However, coal water is immiscible with such heavy organic liquids commonly in use, such as perchloroethylene, and the like, and agglomeration occurs which retards the coal/ash separation. Other methods requiring heat input are inefficient from the point of energy consumed and are not to be pursued unless all else fails.

It is therefore an object of the present invention to provide a method for efficient float/sink separation of high moisture carbonaceous feeds together with simultaneous drying or water removal from the carbonaceous material. Other objects will become apparent to those skilled in this art as the description proceeds.

DESCRIPTION OF THE INVENTION

The present invention provides a method for removing water from coal comprising contacting said coal containing water with a solution of an alcohol containing from 1 to 3 carbon atoms and an organic liquid, said solution having a specific gravity in the range of from about 1.2 to about 1.4, said contacting occurring at a temperature sufficiently high to retain said alcohol and organic material in a single continuous phase for a time sufficient to remove water from the coal, then separating the coal from the alcohol/organic water solution.

Wet coal can be efficiently processed in a two-component float/sink liquid composed of a high density organic component and a water miscible/organic miscible component, such as an alcohol containing from 1 to 3 carbon atoms, with substantial water reduction occurring in the float/sink product.

Representative examples of alcohols useful in the present invention are methanol, ethanol, propanol and isopropanol. Of these, methanol is preferred.

Representative but non-exhaustive examples of organic materials useful in the process of the present invention are perchloroethylene, trichloroethylene, carbon tetrachloride, pentachloropropane, tetrachloropropane, 1,1,1-trichloroethane, chloroform, methylene chloride, 1,1,2-trichloroethane, 1,1,1,2-tetrachloroethane, 1,1,2,2-tetrachloroethane, hexachloroethane, perbromoethylene, tribromoethylene, carbon tetrabromide, hexabromoethane, pentabromopropane, tetrabromopropane, 1,1,1-tribromoethane, ethylene bromide, 1,1,2-tribromoethane, 1,1,1,2-tetrabromoethane, and 1,1,2,2-tetrabromoethane.

In addition, the present invention provides a method for the simultaneous drying and gravity separation of carbonaceous materials, particularly coal, from water and pyrite comprising (a) crushing said coal,
(b) contacting said crushed coal with a solution of an organic liquid and at least one alcohol having from 1 to 3 carbon atoms, said solution having a specific gravity in the range of from about 1.2 to about 1.4 and maintained at a temperature sufficiently high to retain said alcohol and organic material in a continuous phase, said contact for time sufficient to remove water from the coal, while simultaneously
(c) allowing the coal to separate in the organic medium forming a sink/organic phase and a coal float organic phase,
(d) recovering the coal float phase and separating the coal from the coal float organic phase, then
(e) cooling the float coal organic phase to separate alcohol and water from the organic liquid, and separating alcohol from the water.

The method of the present invention, whether used to remove water from coal or simultaneously dry said coal while performing a sink/float pyrite and ash separation, is normally carried out at a temperature of from about 55° C. to about 78° C. However, the temperature can be adjusted depending on the water content of the material in order to maintain a continuous phase. The critical element in determining temperature is the maintenance of a continuous phase.

In carrying out the process of the present invention, the water-containing solution is cooled to form two liquid phases, one which is organic liquid-rich, and one which is water-rich. The water rich phase is distilled to recover methanol and reject water, the methanol then being recycled to the float/sink operation. The organic liquid-rich phase is also distilled to reject small amounts of water remaining whenever necessary, and the organic liquid-rich phase, also containing additional methanol, is recycled to the float sink operation.

Thus the present invention utilizes the fact that a heavy liquid-alcohol mixture at elevated temperatures can absorb water without the mixture separating into distinct organic and aqueous phases. Such alcohols are mutually soluble in both water and organic materials, thus preventing single liquid phases from separating into separate aqueous and organic phases as the aqueous content increases.

GENERAL DESCRIPTION OF THE DRAWINGS

FIG. 1 generally describes the relationship of trichloroethylene, water and methanol in a three part phase diagram, showing the continuous phase region and the preferred region of the present invention.

Figure 2:
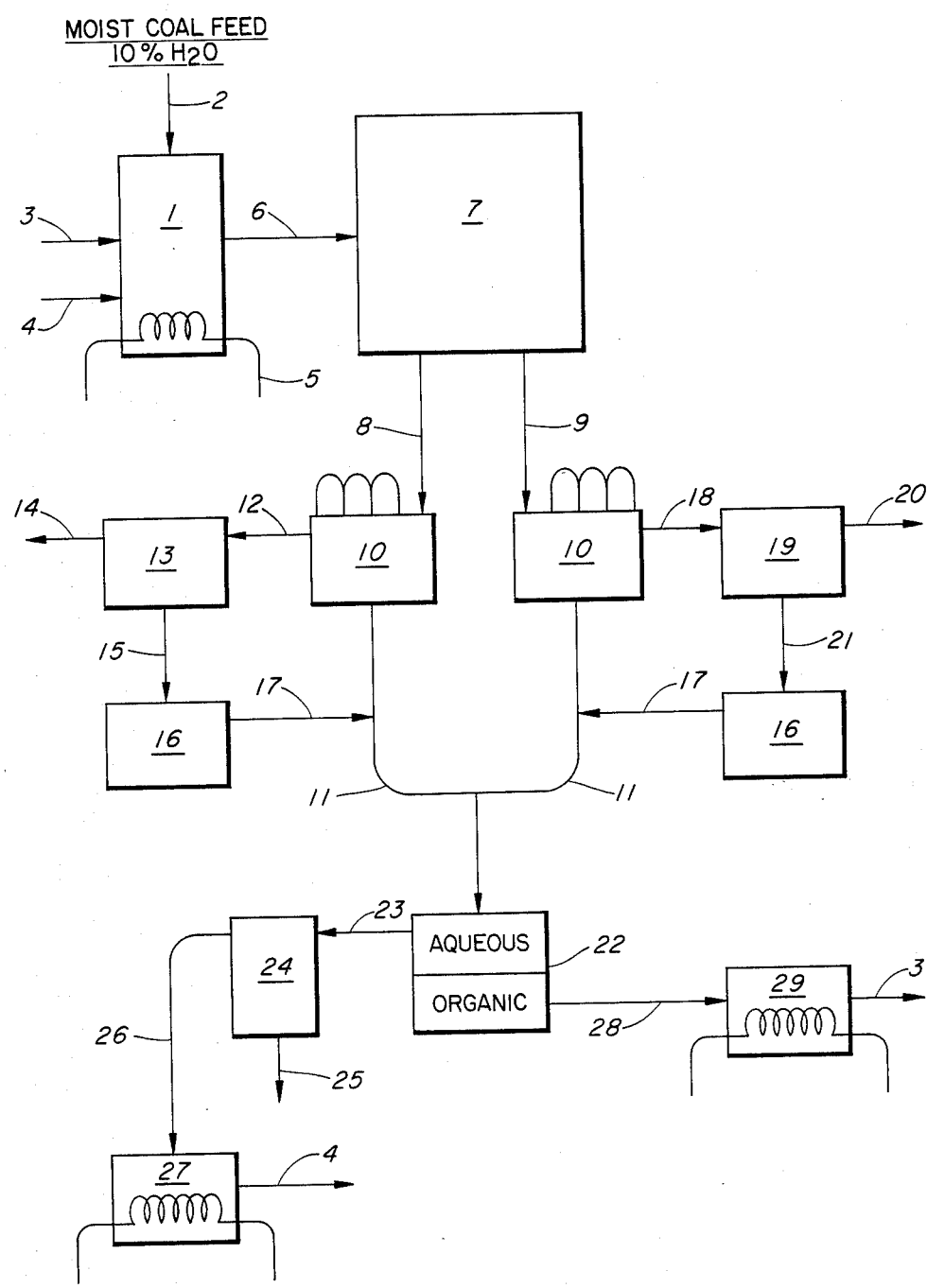

FIG. 2 generally describes the process of the instant invention wherein coal is subjected to drying and float/sink operation simultaneously, together with recovery and recycle of the material.

SPECIFIC DESCRIPTION OF THE DRAWINGS

FIG. 1 shows a three part phase diagram, trichloroethylene, water and methanol at 20° C. This diagram is merely representative of those that can be drawn to the various combinations described in the present invention. Such information is available and representative examples can be found in Chem-Ing-Tech. (1957).

An examination of the figures shows the useful single phase region of the diagram is described, wherein the shaded area designated indicates the operable single phase range, while the shaded area "B" indicates the preferred single phase range, wherein the area above the curve indicates total single phase region.

FIG. 2 shows preferred process of the instant invention. The process is based on experimental results showing the drying effect of the solutions of the present invention.

In the diagram, a moist coal feed containing about 10% water is inserted into a mixing tank (1) through a feed line (2). Also inserted into the mixing tank is tetrachloroethylene (3) and methanol (4). The mixing tank mixture of coal feeds, tetrachloroethylene and methanol is heated by a heater means (5) and then passed through line 6 to a heavy liquid processing unit (7). The heavy liquid processing unit (7) can be any device for separation of float/sink material such as a heavy liquid bath, a heavy liquid cyclone or the like. The heavy liquid processing unit (7) separates the stream into a float phase which exits through line (8) and a sink phase which exits through line (9). Each of line (8) and (9) enter a separation means (10), which is exemplified by a disk filter. The solution filtered from the solid is exited from the separation means via line (11), the float phase separation exits the separation means via line (12) to a dryer means (13) from which exits a product coal stream (14) and a vapor stream (15). The vapor stream (15) is recovered in a vapor recovery system (16) which then is combined (17) with exit line (11).

The sink phase is separated from the solution of the present invention in separation means (10), the solids exiting via line 18 into a refuse dryer (19) which removes the solid refuse (20) and provides a vapor recovery (21). The vapor recovery system (16) is utilized to recover solution (17), which is combined with (11). The combined feeds are passed into a decanter cooler apparatus (22) which separates the material via cooling into aqueous and organic phases. Each of the aqueous and organic phases contain entrained methanol. The aqueous phase (23) containing methanol and water is passed into a distillation column (24) which produces reject water (25) and substantially water-free methanol (26). Methanol (26) is then passed through a storage heater apparatus (27) and returned to the mixing tank via line (4).

The organic phase (28) exits the decanter cooler apparatus (22) passes to a tetrachloroethylene storage heater apparatus (29) and the mixture is returned to the mixing tank (1) via line (3).

It should be realized that the drawing is based upon a 1.3 specific gravity, 37.5 weight percent methanol, 62.5 weight percent tetrachloroethylene mixture.

The instant invention is more concretely described with reference to the examples below wherein all parts and percentages are by weight unless otherwise specified. The examples are provided to illustrate the instant invention and not to limit it.

EXAMPLE 1

McElroy coal ($\frac{3}{8} \times 0$) maximum size of $\frac{3}{8}$ inch containing 17% water (12 grams of coal and water) was combined with 160 grams of a 60° C. tetrachloroethylene and methanol mixture at 1.30 specific gravity. Only a single liquid phase existed. Normal float/sink of high-moisture coal could proceed.

EXAMPLE 2

160 grams of a 1.30 specific gravity composition comprised of 62.6% tetrachloroethylene and 37.5% methanol at 60°-65° C. absorbed 4.5 grams of water (roughly 3% of total weight) before the solution separated into organic and aqueous phases. Based on the information of this example, 1.30 specific gravity and at 60° to 65° C. a 90% coal, 10% water coal feed will be float sunk according to the process described in FIG. 1 at a 22% solids concentration.

Both the cleaned coal and the refuse are separated from the single liquid phase, (as illustrated by filtration), while the liquid phase with increased water content is cooled to form the aqueous and organic phases, each containing alcohol. The organic-alcohol phase is returned to the mixing tank, while the alcohol is recovered from the aqueous phase and recycled, while the remaining water is discarded.

Thus the present invention provides a combined drying separation process for carbonaceous liquids, particularly coal, in a single process procedure to provide coal of high quality and which does not require excessive thermal input.

While certain embodiments and details have been shown for the purpose of illustrating this invention, it will be apparent to those skilled in this art that various changes and modifications may be made herein without departing from the spirit or scope of the invention.

We claim:

1. A method for removing water from coal containing water comprising contacting said coal with a solution of an alcohol containing from 1 to 3 carbon atoms and an organic liquid, said solution having a specific gravity in the range of from about 1.2 to about 1.4, at a temperature sufficiently high to retain said alcohol and organic material in a single continuous phase and for a time sufficient to remove water from the coal, then separating the coal from the alcohol/organic solution and water.

2. A method as described in claim 1 wherein the alcohol/organic liquid contains methanol.

3. A method as described in claim 2 when carried out at a temperature of from about 55° C. to about 78° C.

4. A method as described in claim 3 when carried out at an alcohol to organic weight ratio of from about 3.2:1 to about 1:10 (by weight), respectively.

5. A method as described in claim 4 wherein the organic compound is selected from the group consisting of perbromoethylene, tribromoethylene, carbon tetrabromide, hexabromoethane, pentabromopropane, tetrabromopropane, 1,1,1-tribromoethane, ethylene bromide, 1,1,2-tribromoethane, 1,1,1,2-tetrabromethane, and 1,1,2,2-tetrabromoethane, perchloroethylene, trichloroethylene, carbon tetrachloride, pentachloropropane, tetrachloropropane, 1,1,1-trichloroethane, chloroform, methylene chloride, 1,1,2-trichloroethane, 1,1,1,2-tetrachloroethane, 1,1,2,2-tetrachloroethane, hexachloroethane.

6. A method for the drying and gravity separation of coal from water and pyrite comprising (a) crushing said coal, (b) contacting said crushed coal with a solution of organic liquid and at least one alcohol containing from 1 to 3 carbon atoms, said solution having a specific gravity in the range of from about 1.2 to about 1.4 at a temperature sufficiently high to retain said alcohol and organic material in a continuous phase and for a time sufficient to remove water from the coal, while simultaneously (c) allowing the coal to separate in the organic medium forming a sink organic phase and a coal float organic phase, (d) recovering the coal float phase and separating the coal from the float coal organic phase, then (e) cooling the float coal organic phase to separate alcohol and water from the organic liquid and separating water from the alcohol.

7. A method as described in claim 6 wherein the alcohol/organic liquid contains methanol.

8. A method as described in claim 7 when carried out at a temperature of from about 55° C. to about 78° C.

9. A method as described in claim 8 when carried out at an alcohol to organic liquid ratio of from about 1:1.6 to about 1:10, respectively.

10. A method as described in claim 8 wherein the water-containing solution is cooled to form two liquid phases, one of which is organic liquid-rich containing methanol, the other of which is water-rich containing methanol, wherein the water-rich phase is distilled to recover methanol from the water, the water is rejected and the methanol is recycled to the float/sink operation, wherein the organic liquid rich phase containing methanol and water is distilled to reject water which is discarded, and the remaining portions of the methanol organic liquid is recycled to the float/sink operation.

* * * * *